United States Patent
Fujishiro et al.

(10) Patent No.: US 12,309,868 B2
(45) Date of Patent: May 20, 2025

(54) COMMUNICATION CONTROL METHOD

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

(*) Notice: Subject to any disclaimer, the term of this patent is extended or adjusted under 35 U.S.C. 154(b) by 351 days.

(21) Appl. No.: 17/654,492

(22) Filed: Mar. 11, 2022

(65) Prior Publication Data
US 2022/0201794 A1 Jun. 23, 2022

Related U.S. Application Data

(63) Continuation of application No. PCT/JP2020/033008, filed on Sep. 1, 2020.

(60) Provisional application No. 62/899,852, filed on Sep. 13, 2019.

(51) Int. Cl.
H04W 76/27 (2018.01)
H04W 74/0833 (2024.01)

(52) U.S. Cl.
CPC ....... H04W 76/27 (2018.02); H04W 74/0833 (2013.01); Y02D 30/70 (2020.08)

(58) Field of Classification Search
None
See application file for complete search history.

(56) References Cited

U.S. PATENT DOCUMENTS

| 2018/0270812 | A1* | 9/2018 | Lee | H04W 72/21 |
| 2019/0037433 | A1* | 1/2019 | Nagasaka | H04W 28/0252 |
| 2020/0053686 | A1* | 2/2020 | Edge | H04W 52/0229 |
| 2020/0187245 | A1 | 6/2020 | Fujishiro et al. | |
| 2021/0014864 | A1* | 1/2021 | Phuyal | H04W 72/23 |

FOREIGN PATENT DOCUMENTS

| WO | WO-2019031427 A1 * | 2/2019 | H04W 4/70 |
| WO | WO-2020151678 A1 * | 7/2020 | H04L 1/1822 |

OTHER PUBLICATIONS

U.S. Appl. No. 62/873,836, filed Jul. 10, 2019 (Year: 2019).*

(Continued)

Primary Examiner — Jay L Vogel
(74) Attorney, Agent, or Firm — Studebaker Brackett PLLC

(57) ABSTRACT

A communication control method according to an embodiment is a method for controlling specific data transmission in which a user equipment transmits or receives data of a predetermined size or smaller size during a random access procedure. The communication control method includes transmitting, by the user equipment in an RRC connected state, to a base station, assistance information for the base station to determine whether to perform, on the user equipment, data transmission configuration necessary for performing the specific data transmission, and in response to determining, based on the assistance information, to perform the data transmission configuration on the user equipment, transmitting, by the base station, to the user equipment, an RRC release message including configuration information indicating the data transmission configuration.

6 Claims, 8 Drawing Sheets

(56) References Cited

OTHER PUBLICATIONS

3rd Generation Partnership Project; Technical Specification Group Radio Access Network; NR; NR and NG-RAN Overall Description; Stage 2; 3GPP TS 38.300 V15.6.0; Jun. 2019; pp. 1-99; Release 15; 3GPP Organizational Partners.

Intel Corporation; "Introduction of Rel-16 eMTC Enhancements"; 3GPP TSG-TSG-WG2 Meeting #107; R2-1910387; Aug. 26-30, 2015; pp. 1-24; Prague, Czechia.

SA2; "Reply LS on Mobile-terminated Early Data Transmission"; 3GPP TSG-SA WG2 Meeting #134; S2-198309; Jun. 24-28, 2019; total 6 pages; Sapporo Japan.

* cited by examiner

COMMUNICATION CONTROL METHOD

RELATED APPLICATIONS

The present application is a continuation based on PCT Application No. PCT/JP2020/033008, filed on Sep. 1, 2020, which claims the benefit of U.S. Provisional Patent Application No. 62/899,852 filed on Sep. 13, 2019. The content of which is incorporated by reference herein in their entirety.

TECHNICAL FIELD

The present disclosure relates to a communication control method used in a mobile communication system.

BACKGROUND ART

In the Third Generation Partnership Project (3GPP), which is a standardization project for mobile communication systems, early data transmission (EDT) has been defined in which uplink data transmission is performed during a random access procedure (for example, see NPL 1). In the EDT, during the random access procedure, downlink data transmission can also be performed following the uplink data transmission.

The EDT is initiated when an upper layer of a user equipment requests establishment or resumption of RRC connection for user equipment originated (Mobile Originated (MO)) data and the size of uplink data is less than or equal to a maximum data size indicated in system information.

In the current 3GPP standard, the EDT is applied only to a user equipment for Machine Type Communication (MTC) applications or a user equipment for Internet of Things (IoT) applications, i.e., user equipment that performs Low Power Wide Area (LPWA) communication.

The user equipment performing LPWA communication has a small amount of data to be transmitted and received and infrequently performs data transmission and reception. However, it has been desired to enable the EDT to be applied to a user equipment such as a smartphone instead of limiting the EDT to such user equipment performing LPWA communication.

CITATION LIST

Non Patent Literature

NPL 1: 3GPP TS 38.300 V15.6.0 (2019 June)

SUMMARY OF INVENTION

A communication control method according to a first aspect is a method for controlling specific data transmission in which a user equipment transmits or receives data of a predetermined size or smaller size during a random access procedure. The communication control method includes transmitting, by the user equipment in an RRC connected state, to a base station, assistance information for the base station to determine whether to perform, on the user equipment, data transmission configuration necessary for performing the specific data transmission, and in response to determining, based on the assistance information, to perform the data transmission configuration on the user equipment, transmitting, by the base station, to the user equipment, an RRC release message including configuration information indicating the data transmission configuration.

A communication control method according to a second aspect is a method for controlling specific data transmission in which a user equipment transmits or receives, during a random access procedure, data of a predetermined size or smaller size configured by a base station. The communication control method includes: by the user equipment in an RRC idle state or an RRC inactive state, each time data to be transmitted to a network is generated, storing the data generated and storing a size of the data generated; and transmitting, by the user equipment transitioned to the RRC connected state, to the network, information indicating the size of each piece of the data generated.

DESCRIPTION OF EMBODIMENTS

A mobile communication system according to an embodiment will be described with reference to the drawings. In the description of the drawings, the same or similar parts are denoted by the same or similar reference signs.

Configuration of Mobile Communication System

First, a configuration of a mobile communication system according to an embodiment will be described. While the mobile communication system according to an embodiment is a 3GPP 5G system, Long Term Evolution (LTE) may be at least partially applied to the mobile communication system.

Figure 1:
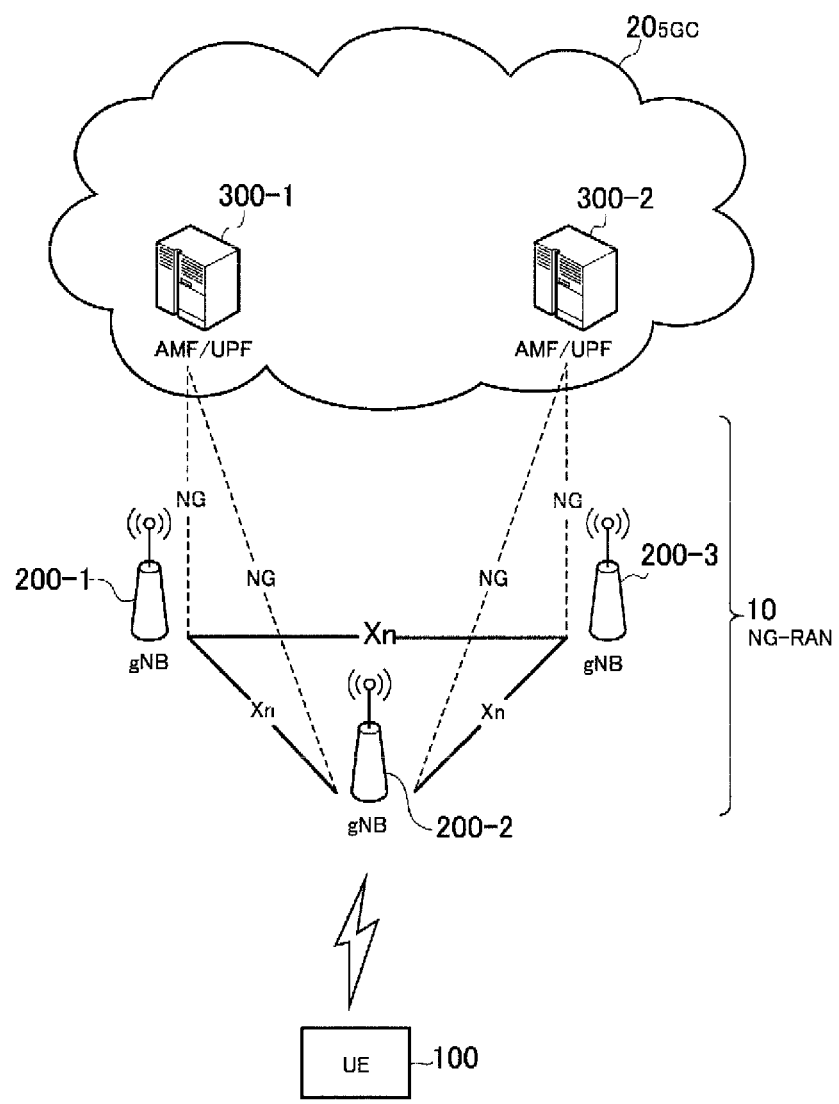
FIG. 1 is a diagram illustrating a configuration of a mobile communication system according to an embodiment.

FIG. 1 is a diagram illustrating a configuration of the mobile communication system according to an embodiment.

As illustrated in FIG. 1, the mobile communication system includes a user equipment (UE) 100, a 5G radio access network (next-generation radio access network (NG-RAN)) 10, and a 5G core network (5GC) 20.

The UE 100 is a mobile apparatus. The UE 100 may be any apparatus as long as the UE is used by a user. For example, the UE 100 includes a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), and/or a flying object or an apparatus provided on a flying object (Aerial UE).

The NG-RAN 10 includes base stations (referred to as "gNBs" in the 5G system) 200. The gNBs 200 may also be referred to as NG-RAN nodes. The gNBs 200 are connected to each other via an Xn interface which is an inter-base station interface. Each gNB 200 manages one or a plurality of cells. The gNB 200 performs wireless communication with the UE 100 that has established a connection with its own cell. The gNB 200 has a radio resource management (RRM) function, a function of routing user data (hereinafter simply referred to as "data"), a measurement control function for mobility control and scheduling, and the like. A "cell" is used as a term to indicate a minimum unit of a wireless communication area. A "cell" is also used as a term to indicate a function or a resource for performing wireless communication with the UE 100. One cell belongs to one carrier frequency.

Note that the gNB may be connected to an evolved packet core (EPC) which is a core network of LTE, or a base station of LTE may be connected to the 5GC. Moreover, the base station of LTE and the gNB may be connected via the inter-base station interface.

The 5GC 20 includes an access and mobility management function (AMF) and a user plane function (UPF) 300. The AMF performs various kinds of mobility control and the like for the UE 100. The AMF manages information of the area in which the UE 100 exists by communicating with the UE 100 by using non-access stratum (NAS) signaling. The UPF controls data transfer. The AMF and UPF are connected to the gNB 200 via an NG interface which is an interface between a base station and the core network.

Figure 2:
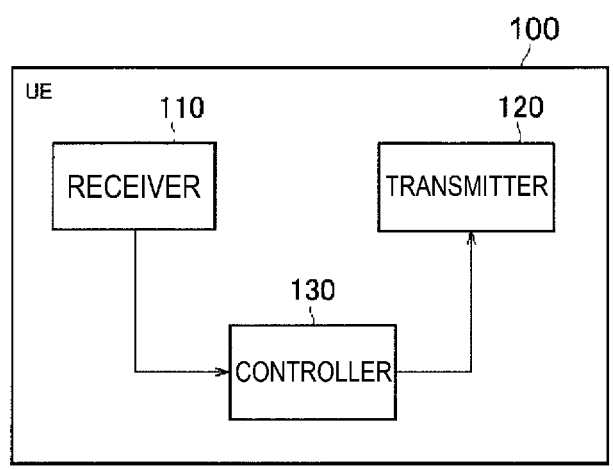
FIG. 2 is a diagram illustrating a configuration of a user equipment according to an embodiment.

FIG. 2 is a diagram illustrating a configuration of the UE 100 (user equipment) according to an embodiment.

As illustrated in FIG. 2, the UE 100 includes a receiver 110, a transmitter 120, and a controller 130.

The receiver 110 performs various kinds of receptions under control of the controller 130. The receiver 110 includes an antenna and a reception device. The reception device converts a radio signal received through the antenna into a baseband signal (reception signal) and outputs the resulting signal to the controller 130.

The transmitter 120 performs various kinds of transmissions under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various kinds of controls for the UE 100. The controller 130 includes at least one processor and at least one memory electrically connected to the processor. The memory stores programs to be executed by the processor and information to be used for processes by the processor. The processor may include a baseband processor and a central processing unit (CPU). The baseband processor performs, for example, modulation, demodulation, and coding and decoding of the baseband signal. The CPU executes the programs stored in the memory to perform various kinds of processes.

Figure 3:
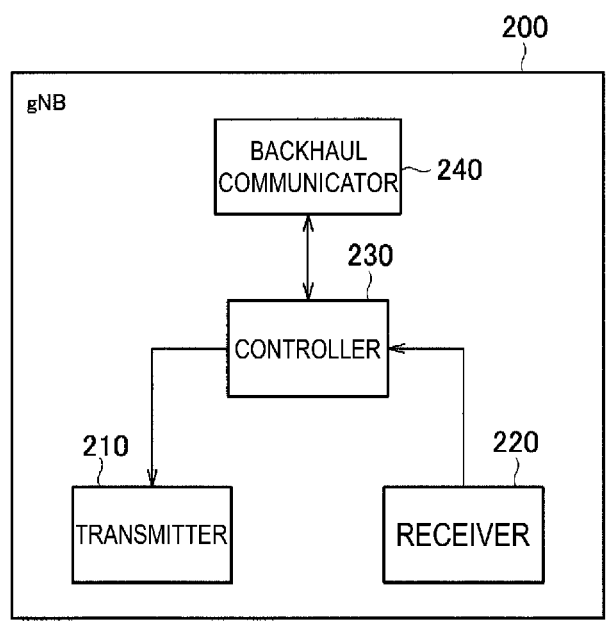
FIG. 3 is a diagram illustrating a configuration of a base station according to an embodiment.

FIG. 3 is a diagram illustrating a configuration of the gNB 200 (base station) according to an embodiment.

As illustrated in FIG. 3, the gNB 200 includes a transmitter 210, a receiver 220, a controller 230, and a backhaul communicator 240.

The transmitter 210 performs various kinds of transmissions under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various kinds of receptions under control of the controller 230. The receiver 220 includes an antenna and a reception device. The reception device converts a radio signal received through the antenna into a baseband signal (a reception signal) and outputs the resulting signal to the controller 230.

The controller 230 performs various kinds of controls for the gNB 200. The controller 230 includes at least one processor and at least one memory electrically connected to the processor. The memory stores programs to be executed by the processor and information to be used for processes by the processor. The processor may include a baseband processor and a CPU. The baseband processor performs, for example, modulation, demodulation, and coding and decoding of the baseband signal. The CPU executes the programs stored in the memory to perform various kinds of processes.

The backhaul communicator 240 is connected to a neighboring base station via the inter-base station interface. The backhaul communicator 240 is connected to the AMF/UPF 300 via the interface between a base station and the core network. Note that the gNB may include a central unit (CU) and a distributed unit (DU) (i.e., functions are divided), and the two units may be connected via an F1 interface.

Figure 4:
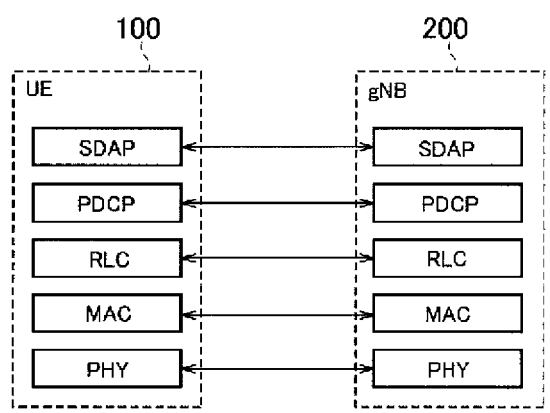
FIG. 4 is a diagram illustrating a configuration of a protocol stack of a radio interface for a user plane handling data.

FIG. 4 is a diagram illustrating a configuration of a protocol stack of a radio interface for a user plane handling data.

As illustrated in FIG. 4, the radio interface protocol of the user plane includes a physical (PHY) layer, a medium access control (MAC) layer, and a radio link control (RLC) layer, a packet data convergence protocol (PDCP) layer, and a service data adaptation protocol (SDAP) layer.

The PHY layer performs coding and decoding, modulation and demodulation, mapping and demapping of antennas, and mapping and demapping of resources. Data and control information are transmitted between the PHY layer of the UE 100 and the PHY layer of the gNB 200 via a physical channel.

The MAC layer performs priority control of data, retransmission processing through a hybrid ARQ (HARQ), a random access procedure, and the like. Data and control information are transmitted between the MAC layer of the UE 100 and the MAC layer of the gNB 200 via a transport channel. The MAC layer of the gNB 200 includes a scheduler. The scheduler determines a transport format (a transport block size, a modulation and coding scheme (MCS)) of uplink and downlink, and an allocation resource block for the UE 100.

The RLC layer transmits data to the RLC layer on the reception side by using the functions of the MAC layer and the PHY layer. Data and control information are transmitted between the RLC layer of the UE 100 and the RLC layer of the gNB 200 via a logical channel.

The PDCP layer is to perform header compression and decompression, and encryption and decryption.

The SDAP layer performs mapping between an IP flow which is a unit of QoS control by the core network and a radio bearer which is a unit of QoS control by an access stratum (AS). Note that, when the RAN is connected to the EPC, the SDAP need not be provided.

Figure 5:
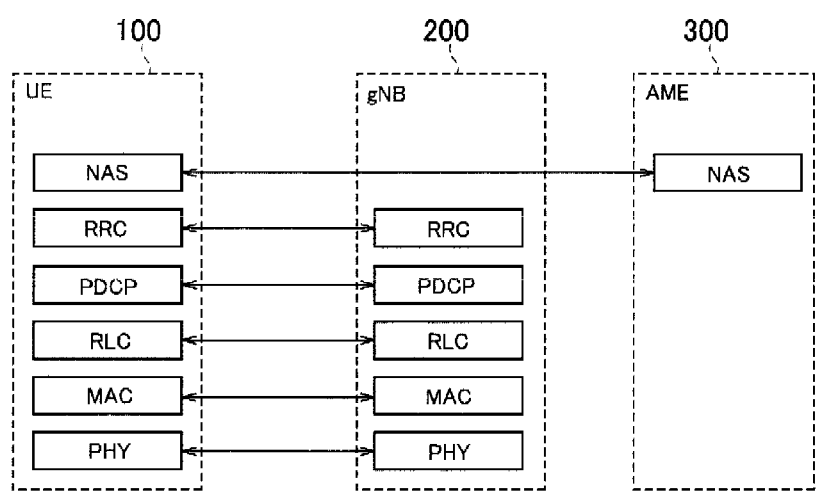
FIG. 5 is a diagram illustrating a configuration of a protocol stack of a radio interface for a control plane handling signaling (control signals).

FIG. 5 is a diagram illustrating a configuration of a protocol stack of a radio interface for a control plane handling signaling (control signals).

As illustrated in FIG. 5, the protocol stack of the radio interface for the control plane has a radio resource control (RRC) layer and a non-access stratum (NAS) layer instead of the SDAP layer illustrated in FIG. 4.

RRC signaling for various configurations is transmitted between the RRC layer of the UE 100 and the RRC layer of the gNB 200. The RRC layer controls the logical channel, the transport channel, and the physical channel in response to establishment, re-establishment, and release of the radio bearer. When there is a connection (RRC connection) between the RRC of the UE 100 and the RRC of the gNB 200, the UE 100 is in an RRC connected state. When there is no connection (RRC connection) between the RRC of the UE 100 and the RRC of the gNB 200, the UE 100 is in an RRC idle state. Furthermore, when the RRC connection is interrupted (suspended), the UE 100 is in an RRC inactive state.

The NAS layer higher than the RRC layer performs session management, mobility management, and the like. NAS signaling is transmitted between the NAS layer of the UE 100 and the NAS layer of the AMF 300.

Note that the UE 100 has an application layer and the like other than the protocol of the radio interface.

Specific Data Transmission

Now, specific data transmission according to an embodiment will be described. In an embodiment, a scenario is assumed in which the EDT described above is introduced into a 5G system. In such a scenario, the EDT may be referred to as small data transmission (SDT). The specific data transmission refers to EDT or SDT. Embodiments will be described below in which the EDT of LTE is introduced into a 5G system (NR). However, the EDT may be interpreted as the SDT.

In the EDT, uplink data transmission is performed during a random access procedure. Additionally, in the EDT, during the random access procedure, downlink data transmission can be performed following the uplink data transmission. The EDT is initiated when an upper layer of the UE 100 requests establishment or resumption of RRC connection for UE originated (Mobile Originated (MO)) data and the size of uplink data is less than or equal to a maximum data size indicated in system information.

The EDT includes uplink EDT in which uplink data is transmitted and received by using Msg3 in the random access procedure and downlink EDT in which downlink data is transmitted and received by using Msg4 in the random access procedure. Specifically, during one random access procedure, the uplink EDT may exclusively be performed, or both uplink EDT and downlink EDT may be performed. During one random access procedure, the uplink EDT may exclusively be performed.

The EDT includes two types of solution: User Plane (UP) Solution and Control Plane (CP) solution. In the UP solution, in the EDT, with no user data included in an RRC message, user data (DTCH) and an RRC message (CCCH) are multiplexed in one MAC PDU in the MAC layer for transmission. On the other hand, in the CP solution, in the EDT, user data is included in the RRC message.

The UP solution is applicable in a case that the UE 100 is in the RRC inactive state. In the RRC inactive state, context information of the UE 100 is maintained in the gNB 200. In the UP solution, the RRC message constituting the Msg3 is an RRC Resume Request message, and the RRC message constituting the Msg4 is basically an RRC Release message. In response to receiving the RRC Release message, the UE 100 ends the random access procedure while maintaining the RRC idle state. However, the RRC message constituting the Msg4 may be an RRC Resume message. In response to receiving the RRC Resume message, the UE 100 transitions to the RRC connected state and transmits and receives user data in the RRC connected state.

The CP solution is applicable in a case that the UE 100 is in the RRC idle state. In the CP solution, the RRC message constituting the Msg3 is an RRC Early Data Request message, and the RRC message constituting the Msg4 is an RRC Early Data Complete message. In response to receiving the Early Data Complete message, the UE 100 ends the random access procedure while maintaining the RRC idle state. However, the RRC message constituting the Msg4 may be an RRC Setup message. In response to receiving the RRC Setup message, the UE 100 transitions to the RRC connected state and transmits and receives user data in the RRC connected state.

In the following, the UP solution of the EDT is mainly assumed. However, the present embodiment is not limited to the UP solution, and the CP solution may be assumed.

In the UP solution of the EDT, for the UE 100 to perform the EDT, the gNB 200 needs to perform EDT configuration for the UE 100 in advance. For example, an RRC release message needs to have been transmitted from the gNB 200 to the UE 100, the RRC release message including configuration information (drb-ContinueROHC) indicating whether to perform (continue) header compression during the EDT and configuration information (nextHopChainingCount) for update of a security key (KeNB).

The EDT of LTE is applied only to the UE 100 performing LPWA communication. Such UE 100 has a small amount of data to be transmitted and received and infrequently performs data transmission and reception. Thus, it is conceived to be typical that the size of uplink data transmitted by the UE 100 by the EDT may be less than or equal to the maximum data size configured in the system information. Accordingly, whether the gNB 200 is to perform the EDT configuration on the UE 100 is easily determined.

However, in a case that the EDT is applicable to the UE 100 such as a smartphone as well as to the UE 100 performing LPWA communication, the gNB 200 has difficulty in determining whether a small amount of data (small packet) is transmitted in the traffic pattern of the UE 100, particularly during the EDT. Thus, the gNB 200 has difficulty in determining whether to perform the EDT configuration on the UE 100.

Thus, in an embodiment, assistance information is provided from the UE 100 to the gNB 200 to facilitate the determination of whether the gNB 200 performs the EDT configuration on the UE 100.

The communication control method according to an embodiment is a method for controlling EDT in which the UE 100 transmits or receives data of a predetermined size or smaller during the random access procedure. Here, the predetermined size refers to the maximum data size configured in the system information, but the maximum data size may be configured by signaling for each UE 100 (dedicated signaling), or may be predefined according to specifications. Additionally, the predetermined size refers to the maximum data size of uplink data, but may be the maximum data size of downlink data. The maximum data size may be represented by a transport block size (TBS).

In the communication control method according to an embodiment, the UE 100 in the RRC connected state transmits, to the gNB 200, assistance information (referred to hereinafter as "EDT assistance information") for the gNB 200 to determine whether to perform, on the UE 100, the data transmission configuration necessary for performing the EDT (i.e., the EDT configuration). In response to determining that the EDT configuration is performed on the UE 100 based on the EDT assistance information, the gNB 200 transmits, to the UE 100, the RRC release message including configuration information indicating the EDT configuration (hereinafter referred to as "EDT configuration information"). Accordingly, by providing the EDT assistance information from the UE 100 to the gNB 200, the determination of whether the gNB 200 performs the EDT configuration on the UE 100 can be facilitated.

Operation Example

Figure 6:
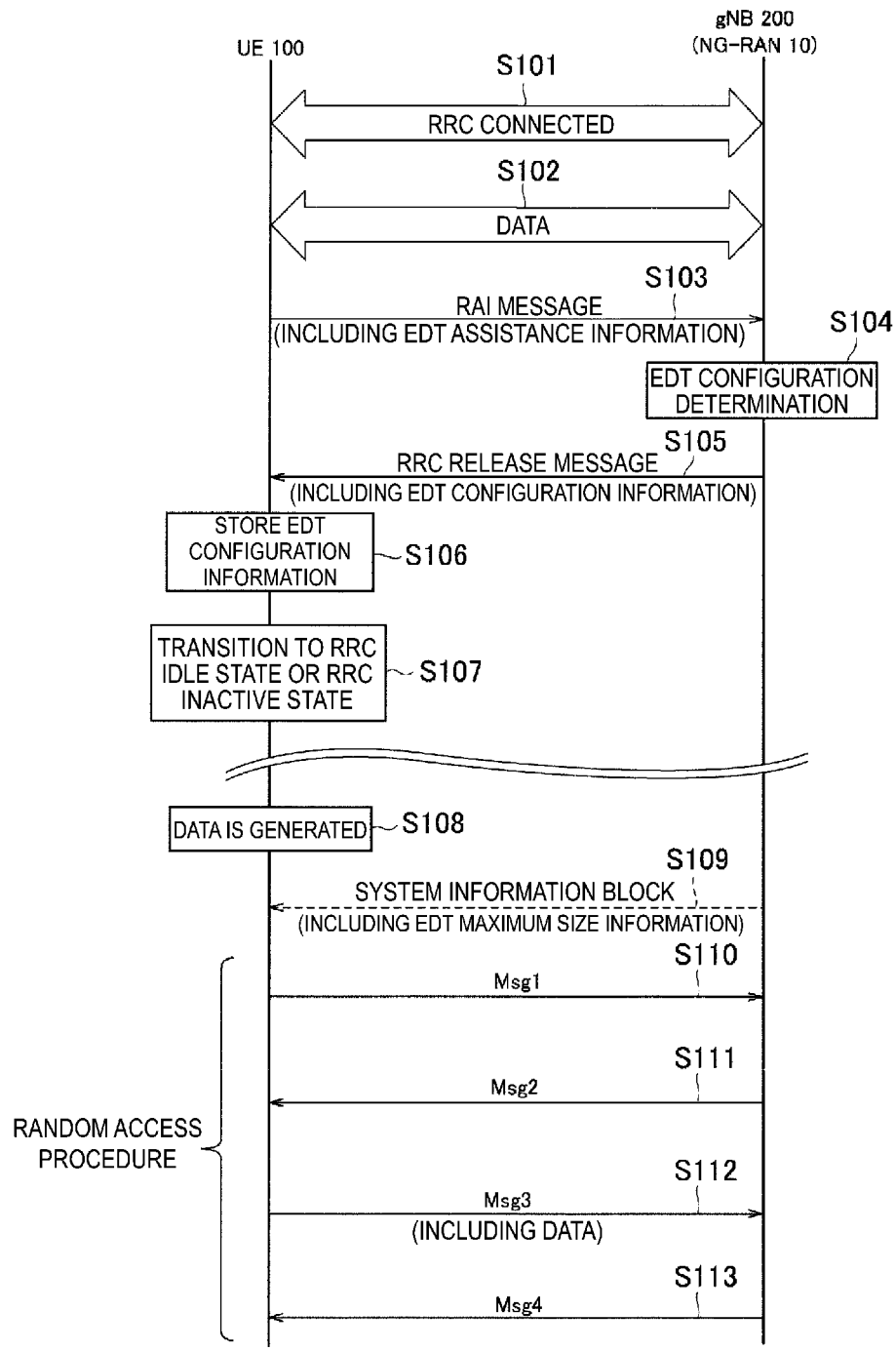
FIG. 6 is a diagram illustrating an operation example according to an embodiment.

Now, an operation example according to an embodiment will be described. FIG. 6 is a diagram illustrating an operation example according to an embodiment.

As illustrated in FIG. 6, in step S101, the UE 100 is in the RRC connected state in a cell of the gNB 200.

In step S102, UE 100 transmits and receives data (user data) to and from the gNB 200.

In step S103, the UE 100 determines that there is no data to be transmitted to and received from the gNB 200 or that there will be no data to be transmitted to and received from the gNB 200, and transmits, to the gNB 200, an RRC message for urging the gNB 200 to release or interrupt the RRC connection of the UE 100. Such an RRC message may be referred to as a Release Assistance Indication (RAI) message.

Here, the UE 100 includes, in the RAI message, EDT assistance information for the gNB 200 to determine whether to perform, on the UE 100, the EDT configuration necessary for performing the EDT.

The EDT assistance information may include request information for requesting that the gNB 200 perform the EDT configuration. The UE 100 determines the size and/or generation pattern of data to be transmitted or received in the future and determines whether the UE 100 is to perform the EDT based on the size and/or generation pattern determined.

Specifically, the data to be transmitted or received in the future refers to data to be transmitted or received after the UE 100 transitions to the RRC idle state or the RRC inactive state. For example, the data to be transmitted or received in the future may be the next data to be transmitted or received by the UE 100 or the data to be transmitted or received after the next data by the UE 100. The UE 100 predicts the data to be transmitted or received in the future based on, for example, information obtained from the application layer or the like.

Then, in response to determining that the UE 100 is to perform the EDT, the UE 100 transmits, to the gNB 200, request information for requesting that the gNB 200 perform the EDT configuration. For example, the UE 100 may determine that the UE 100 is to perform the EDT in response to satisfaction of at least one of a first condition that the size of data to be transmitted or received in the future is smaller than or equal to a predetermined size and a second condition that data to be transmitted or received in the future is one-off data (i.e., the data is not continuously transmitted or received).

The EDT assistance information may include data-related information related to data to be transmitted or received by the UE 100 in the future.

The data-related information may include size information related to the size of the data to be transmitted or received by the UE 100 in the future. The size information may be information indicating a transport block size of data to be transmitted or received by the UE 100 in the future. Alternatively, the size information may be an identifier indicating whether the transport block size of the data to be transmitted or received by the UE 100 in the future is smaller than or equal to a predetermined size. The UE 100 may transmit the size information to the gNB 200 exclusively in a case that the data to be transmitted or received by the UE 100 in the future is expected to be one-off data.

Note that a condition for "one-off data," for example, a data generation interval, may be configured for the UE 100 by the gNB 200.

The data-related information may include time information related to a generation pattern for data to be transmitted or received by the UE 100 in the future. The time information may include information indicating whether the data to be transmitted or received by the UE 100 in the future is one-off data. The time information may include information indicating a generation interval (generation period) for the data to be transmitted or received by the UE 100 in the future. The time information may include information indicating a time stamp of generation of the data to be transmitted or received by the UE 100 in the future. Here, the time stamp of generation may be a relative time stamp (for example, 30 seconds later) or may be an absolute time (e.g., (H-) SFN number).

Note that the RAI message is not limited to an RRC message, and may be a MAC control element (MAC CE). The MAC CE may be intended to urge the gNB 200 to release or interrupt the RRC connection of the UE 100.

In step S104, the gNB 200 determines whether to perform the EDT configuration on the UE 100 based on the EDT assistance information included in the RAI message received from UE 100. An example in which the gNB 200 determines to perform the EDT configuration on the UE 100 will be described below.

In step S105, the gNB 200 transmits, to the UE 100, the RRC release message with the EDT configuration information indicating the EDT configuration. The EDT configuration information includes at least one of configuration information (drb-ContinueROHC) indicating whether header compression is performed (continued) during the EDT and configuration information (nextHopChainingCount) for update of the security key (KeNB).

In a case that the gNB 200 causes the UE 100 to transition to the RRC inactive state, the gNB 200 includes configuration information of the RRC inactive state (Suspend Config.) in the RRC release message. The gNB 200 may include the EDT configuration information in Suspend Config.

However, in step S104, in response to determining not to perform the EDT configuration on the UE 100, gNB 200 transmits, to the UE 100, the RRC release message not including the EDT configuration information.

In step S106, the UE 100 stores the EDT configuration information included in the RRC release message received from the gNB 200.

In step S107, the UE 100 transitions from the RRC connected state to the RRC idle state or the RRC inactive state in response to receiving the RRC release message from the gNB 200.

Subsequently, in step S108, uplink data is generated in the UE 100, and the upper layer of the UE 100 requests the establishment or resumption of the RRC connection for the UE originated (MO) data.

In step S109, the UE 100 receives system information (system information blocks) broadcast from the gNB 200, and obtains EDT maximum size information included in the system information. The EDT maximum size information is information indicating the maximum data size of uplink data for the EDT.

Here, the UE 100 determines whether the size of the uplink data generated in step S108 is smaller than or equal to the maximum data size indicated by the EDT maximum size information. In a case that the size of the uplink data generated in step S108 is smaller than or equal to the maximum data size indicated by the EDT maximum size information, the UE 100 determines that the EDT is applicable, and otherwise determines that the EDT is not applicable. The description below assumes that the UE 100 determines that EDT is applicable.

Steps S110 to S113 constitute the random access procedure. In step S110, the UE 100 transmits Msg1 (random access preamble) to the gNB 200. Note that "Msg" stands for a message.

In step S111, the gNB 200 transmits, to the UE 100, Msg2 (random access response) including scheduling information indicating an uplink radio resource allocated to the UE 100.

In step S112, the UE 100 transmits the Msg3 to the gNB 200 based on the scheduling information from the gNB 200. The Msg3 is, for example, an RRC Resume Request message. In the MAC layer, the UE 100 multiplexes the user data (DTCH) and the RRC Resume Request message in one MAC PDU for transmission. Accordingly, uplink EDT is performed. In this regard, the EDT configuration information is applied to the transmission of the user data (uplink data).

In step S113, the gNB 200 transmits the Msg4 to the UE 100. For example, the Msg4 is an RRC Release message. The gNB 200 may multiplex downlink data and the RRC Release message for transmission. Accordingly, downlink EDT is performed. In response to receiving the RRC Release message, the UE 100 ends the random access procedure while maintaining the RRC idle state or the RRC inactive state.

In the present operation example, an example has been described in which the EDT assistance information is included in the RAI message, but the EDT assistance information may be included in a message other than the RAI message (e.g., an RRC message or a MAC CE). The UE 100 may include the EDT assistance information in any message as long as the message is transmitted to the gNB 200 before receiving the RRC release message from gNB 200.

Modification 1

Now, Modification 1 of the embodiment described above will be described below. At least some of the operations of the embodiment described above are applicable to Modification 1.

As described above, in a case that the gNB 200 configures, for the UE 100, the maximum data amount (maximum transport block size) for the EDT, the gNB 200 has difficulty in determining the optimal maximum data amount. Specifically, the amount of data (transport block size) transmitted and received by the UE 100 by using the EDT varies depending on the type of the application executed by the UE 100 and on the situation. An excessively large maximum data amount configured for the EDT may lead to wasteful resources. On the other hand, an excessively small maximum data amount configured for the EDT prevents the UE 100 desiring to transmit and receive data exceeding the maximum transport block size from utilizing the EDT, thus impairing the effect by the EDT of reducing power consumption and delay.

In Modification 1, the UE 100 determines the amount of user data to be transmitted and received in the EDT. For example, the UE 100 determines the amount of uplink data that the UE 100 wants to transmit by uplink EDT. In addition to or in lieu of such determination, the UE 100 may determine the amount of downlink data that the UE 100 wants to receive by downlink EDT. Then, when the UE 100 is in the RRC connected state, the UE 100 transmits information indicating the maximum data amount recommended by UE 100 (maximum transport block size) to the gNB 200 based on the amount of user data determined. Such a recommended maximum data amount may be an uplink recommended maximum data amount or a downlink recommended maximum data amount.

Such notification of the maximum data amount may be performed exclusively by the UE 100 being capable of performing the EDT. In such a case, the gNB 200 may store the notification from the UE 100 in a UE context as UE capability information.

The gNB 200 determines the optimal maximum data amount for the EDT by collecting, from a large number of the UEs 100, information of the recommended maximum data amount for the EDT and performing statistical processing on the information collected. For example, the gNB 200 collects the information of the recommended maximum data amount for the uplink EDT and determines the optimal maximum data amount in the uplink EDT based on the information collected. The gNB 200 may collect the information of the recommended maximum data amount for the downlink EDT and determine the optimal maximum data amount in the downlink EDT based on the information collected. After determining the optimal maximum data amount, the gNB 200 configures the determined maximum data amount for the UE 100. For example, the gNB 200 configures the maximum data amount for the UE 100 within the cell of the gNB 200 by broadcasting information indicating the determined maximum data amount.

Figure 7:
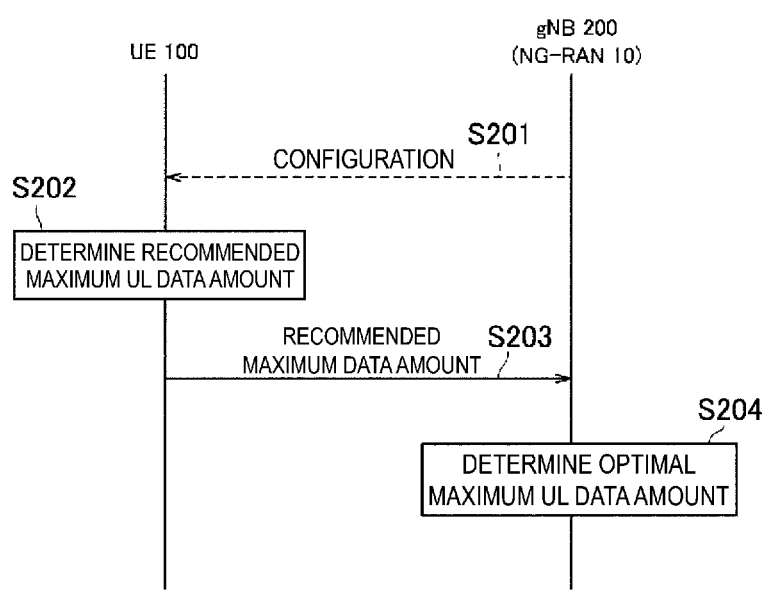
FIG. 7 is a diagram illustrating operations of Modification 1.

FIG. 7 is a diagram illustrating operations of Modification 1. Now, an example will be described in which the recommended maximum uplink data amount for the EDT is notified from the UE 100 to the gNB 200 by utilizing the Msg3. Note that the following example is described by using the recommended maximum uplink data amount as an example, but can also be applied by using the recommended maximum downlink data amount instead.

As illustrated in FIG. 7, in step S201, the gNB 200 transmits, to the UE 100, information for requesting or configuring transmission of notification of the recommended maximum uplink data amount for the EDT. The gNB 200 may include such information in the Msg4 (RRC Connection Setup message) in the random access procedure, a Measurement Configuration used as a unicast message, a UE Information Request message and/or a Minimization of Drive Test (MDT) configuration messages. Alternatively, the gNB 200 may use a broadcast message to broadcast, to the UE 100, information for allowing or requesting the notification. However, step S201 is not required and can be omitted.

Note that in step S201, the gNB 200 may configure, for the UE 100, conditions for enabling transmission of the recommended maximum uplink data amount. For example, the gNB 200 configures, for the UE 100, conditions including a data generation interval of 1 second or more and a data size of 50 kB or smaller.

In step S202, the UE 100 determines the recommended maximum uplink data amount for the EDT. For example, the UE 100 stores the amount of uplink data when the random access procedure is performed in response to generation of uplink data, and determines the amount of uplink data stored as the recommended maximum uplink data amount.

In step S203, the UE 100 transmits, to the gNB 200, information indicating the determined recommended maximum uplink data amount. The UE 100 may include such information in a measurement report, Msg5 (RRC Connection Setup Complete or RRC Connection Resume Complete) in the random access procedure, a UE Information Response message, or a UE Assistance Information message. Note that RRC Connection Setup Complete and RRC Connection Resume Complete may be positioned as messages transmitted from the UE 100 to the gNB 200 immediately after the random access procedure.

Note that in a case that the amount of uplink data generated in the UE 100 in the RRC idle state exceeds the maximum uplink data amount configured by the gNB 200, the UE 100 may initiate a normal random access procedure without the EDT and may store the amount of the uplink data. Then, after transitioning to the RRC connected state by the normal random access procedure, the UE 100 may notify the gNB 200 of the stored amount of uplink data as the recommended maximum uplink data amount.

In step S204, the gNB 200 determines the optimal maximum uplink data amount based on the recommended maximum uplink data amount notified from the UE 100. After determining the optimal maximum uplink data amount, the gNB 200 broadcasts the determined maximum uplink data amount to configure the maximum uplink data amount for the UE 100 within the cell of the gNB 200.

Alternatively, the gNB 200 is not limited to the case where the gNB 200 configures the maximum data amount (maximum uplink data amount) for the UE 100 by broadcasting, and may configure the maximum data amount for the UE 100 by unicasting (e.g., RRC Connection Release). In such a case, the gNB 200 determines the optimal maximum data amount for the UE 100 based on the recommended maximum data amount notified from the UE 100 and configures the determined maximum data amount for the UE 100 by unicasting.

Modification 2

Now, Modification 2 of the embodiment described above will be described with differences from Modification 1 focused on. At least some of the operations of Modification 1 are applicable to Modification 2.

Modification 1 assumes a scenario in which when uplink data is generated in the UE 100 in the RRC idle state or the RRC inactive state, uplink transmission is immediately initiated. However, for uplink data and the like that are allowed to be delayed, the UE 100 may accumulate uplink data (packets) exceeding the EDT maximum data size, and collectively transmit the accumulated data (a plurality of packets).

In this regard, the gNB 200 can determine the size of data transmitted by the UE 100 after establishment of RRC connection. However, in a case that small packets are intermittently generated, and the UE 100 transmits these plurality of small packets at a time, then the gNB 200 can only determine the total packet size and fails to determine the size of each packet. Thus, in Modification 2, the gNB 200 (network) can determine the size of each data generated in the UE 100 in the RRC idle state or the RRC inactive state.

A communication control method according to Modification 2 is a method for controlling the EDT in which the UE 100 transmits or receives, during a random access procedure, data of a predetermined size or smaller configured by the gNB 200. In the communication control method according to Modification 2, each time data is generated that is to be transmitted to the network, the UE 100 in the RRC idle state or the RRC inactive state stores the data generated and stores the size of the data generated. In response to transitioning to the RRC connected state, the UE 100 transmits, to the network, information indicating the size of each piece of the data generated (hereinafter referred to as "data size information"). As a result, the network can determine the size of each piece of the data generated in the UE 100 in the RRC idle state or the RRC inactive state. Then, the network can optimize the maximum uplink data amount for the EDT as is the case with Modification 1 based on the determined size of each piece of the data.

In Modification 2, in response to transitioning to the RRC connected state, the UE 100 may further transmit, to the network, time stamp information of each piece of the data generated. The time stamp information is information (time-stamp information) indicating the time stamp when the data is generated. Thus, even in a case that the UE 100 holds the data for a long period of time, the network can determine the time stamp of generation of the data. This facilitates, for example, operation in which the maximum uplink data amount for the EDT is configured for each period of time.

In Modification 2, in response to transitioning to the RRC connected state, the UE 100 may further transmit, to the network, position information of each piece of the data generated data. The position information is information indicating the position of the UE 100 when the data is generated (e.g., GNSS position information). Thus, even in a case that the UE 100 holds the data for a long period of time, the network can determine the position where the data is generated. This facilitates, for example, optimizing the maximum uplink data amount for the EDT for a cell corresponding to the data generation position.

Figure 8:
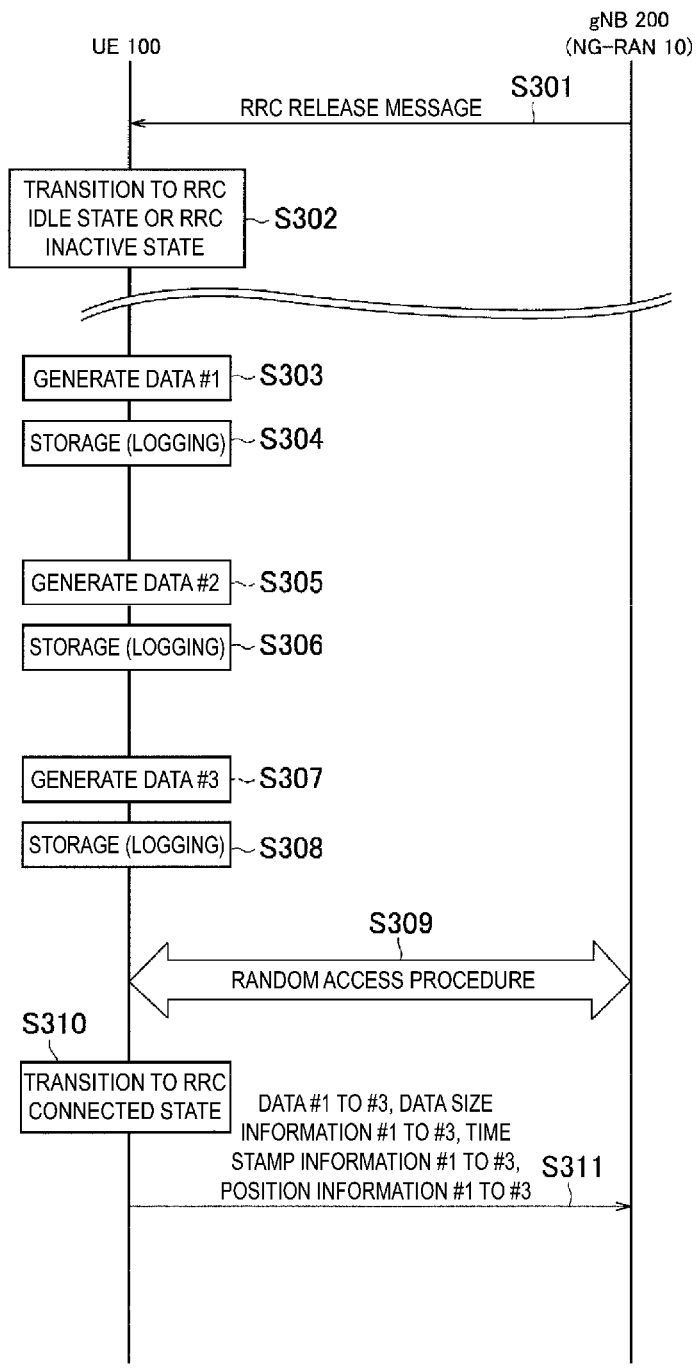
FIG. 8 is a diagram illustrating operations of Modification 2.

FIG. 8 is a diagram illustrating operations of Modification 2.

As illustrated in FIG. 8, in step S301, the UE 100 receives the RRC release message from the gNB 200. The RRC release message may include logging configuration information for configuring, for the UE 100, storage (logging) of at least one of data size information, time stamp information, and position information.

In step S302, in accordance with the RRC release message from the gNB 200, the UE 100 transitions from the RRC connected state to the RRC idle state or the RRC inactive state.

In step S303, the UE 100 generates uplink data #1, and stores uplink data #1 generated.

In step S304, the UE 100 acquires data size information #1, time stamp information #1, and position information #1 for uplink data #1, and stores the information acquired (logging).

In step S305, the UE 100 generates uplink data #2, and stores uplink data #2 generated.

In step S306, the UE 100 acquires data size information #2, time stamp information #2, and position information #2 for uplink data #2, and stores the information acquired (logging).

In step S307, the UE 100 generates uplink data #3, and stores uplink data #3 generated.

In step S308, the UE 100 acquires data size information #3, time stamp information #3, and position information #3 for uplink data #3, and stores the information acquired (logging).

In step S309, the UE 100 performs the random access procedure with the gNB 200.

In step S310, the UE 100 transitions to the RRC connected state.

In step S311, UE 100 transmits, to the gNB 200, uplink data #1 to #3 stored, data size information #1 to #3 stored, time stamp information #1 to #3 stored, and position information #1 to #3 stored.

Other Embodiments

In Modifications 1 and 2 described above, an example has been described in which the maximum uplink data amount for the EDT is optimized, but instead of such optimization, the application of the EDT (i.e., EDT on/off) may be switched for each cell.

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like.

In addition, circuits for executing the processes to be performed by the UE 100 or the gNB 200 may be integrated, and at least part of the UE 100 or the gNB 200 may be configured as a semiconductor integrated circuit (a chipset or an SoC).

Although an embodiment have been described in detail with reference to the drawings, a specific configuration is not limited to those described above, and various design modifications and the like can be made without departing from the gist.

The invention claimed is:

1. A communication control method for controlling specific data transmission in which a user equipment in a Radio Resource Control (RRC) idle state transmits user data to a base station without transitioning to of a RRC connected state, the communication control method comprising:
   transmitting, by the user equipment in the RRC connected state, to the base station, a request message requesting the base station to perform, on the user equipment, data transmission configuration necessary for performing the specific data transmission; and
   based on the request message, transmitting, by the base station, to the user equipment, an RRC connection release message including configuration information indicating the data transmission configuration, wherein
   the request message includes time information related to a generation pattern for the user data to be transmitted by the user equipment in future, and
   the request message includes information indicating Hyper System Frame Number (H-SFN) of occasion of the user data to be transmitted by the user equipment in the future.

2. The communication control method according to claim 1, wherein
   the time information includes information indicating a periodicity of transmission of the user data.

3. The communication control method according to claim 1, wherein
   the request message includes include size information related to a size of the user data to be transmitted by the user equipment in future.

4. A processor in a user equipment controlling specific data transmission in which the user equipment in a Radio Resource Control (RRC) idle state transmits user data to a base station without transitioning to of a RRC connected state, the processor configured to:
   transmit, when the user equipment in the RRC connected state, to the base station, a request message requesting the base station to perform, on the user equipment, data transmission configuration necessary for performing the specific data transmission; and
   receive from the base station an RRC connection release message including configuration information indicating the data transmission configuration, wherein
   the request message includes time information related to a generation pattern for the user data to be transmitted by the user equipment in future, and
   the request message includes information indicating Hyper System Frame Number (H-SFN) of occasion of the user data to be transmitted by the user equipment in the future.

5. A user equipment performing specific data transmission in which the user equipment in a Radio Resource Control (RRC) idle state transmits user data to a base station without transitioning to of a RRC connected state, the user equipment comprising:
   a transmitter configured to transmit, when the user equipment in the RRC connected state, to the base station, a request message requesting the base station to perform, on the user equipment, data transmission configuration necessary for performing the specific data transmission; and
   a receiver configured to receive from the base station an RRC connection release message including configuration information indicating the data transmission configuration, wherein
   the request message includes time information related to a generation pattern for the user data to be transmitted by the user equipment in future, and
   the request message includes information indicating Hyper System Frame Number (H-SFN) of occasion of the user data to be transmitted by the user equipment in the future.

6. A base station communicating with a user equipment controlling specific data transmission in which the user equipment in a Radio Resource Control (RRC) idle state transmits user data to the base station without transitioning to of a RRC connected state, the base station comprising:
   a receiver configured to receive, when the user equipment in the RRC connected state, from the user equipment, a request message requesting the base station to perform, on the user equipment, data transmission configuration necessary for performing the specific data transmission; and
   a transmitter configured to transmit to the user equipment, an RRC connection release message including configuration information indicating the data transmission configuration, wherein
   the request message includes time information related to a generation pattern for the user data to be transmitted by the user equipment in future, and
   the request message includes information indicating Hyper System Frame Number (H-SFN) of occasion of the user data to be transmitted by the user equipment in the future.

* * * * *